US010908351B2

(12) United States Patent
Snijkers et al.

(10) Patent No.: US 10,908,351 B2
(45) Date of Patent: Feb. 2, 2021

(54) FRAME FOR SUPPORTING A LIGHT GUIDE PANEL AND LUMINAIRE COMPRISING THE FRAME

(71) Applicant: SIGNIFY HOLDING B.V., Eindhoven (NL)

(72) Inventors: Robertus Johannes Maria Mathilde Snijkers, Eindhoven (NL); René Theodorus Wegh, Eindhoven (NL); Eugen Jacob De Mol, Eindhoven (NL); Guy Louis Paul De Bondt, Eindhoven (NL); Nicolaas Antonie Van Rijswijk, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/890,391

(22) Filed: Feb. 7, 2018

(65) Prior Publication Data
US 2018/0231710 A1 Aug. 16, 2018

(30) Foreign Application Priority Data
Feb. 13, 2017 (EP) ..................................... 17155848

(51) Int. Cl.
*G02B 6/00* (2006.01)
*F21V 8/00* (2006.01)
(Continued)

(52) U.S. Cl.
CPC ............ *G02B 6/0088* (2013.01); *F21V 15/01* (2013.01); *F21V 19/005* (2013.01);
(Continued)

(58) Field of Classification Search
CPC .... G02B 6/0088; G02B 6/0091; G02B 6/009; G02B 6/0073; F21V 23/003; F21V 29/15;
(Continued)

(56) References Cited

U.S. PATENT DOCUMENTS

| 7,954,979 B2 | 6/2011 | Sommers et al. |
| 2004/0120156 A1 | 6/2004 | Ryan |

(Continued)

FOREIGN PATENT DOCUMENTS

| CA | 2553921 A1 | 1/2005 |
| CN | 201265805 Y | 7/2009 |

(Continued)

*Primary Examiner* — Y M. Quach Lee

(57) ABSTRACT

The present invention relates to a frame (100) for supporting a light guide panel (120). The frame (100) being provided with: a solid state light source (102) connected to and arranged on a circuit board (104), the circuit board (104) comprising an electrically insulating outer perimeter portion (104a); an insulation layer (106) being electrically insulating, the insulation layer (106) having a surface area larger than a surface area of the circuit board (104); wherein the insulation layer (106) is arranged on the frame (100); the circuit board (104) is arranged on the insulation layer (106) such that an insulating outer perimeter portion (106a) of the insulation layer (106) is formed outside of the circuit board (106); thereby providing a double insulation of the solid state light source (102) in relation to the frame (100). The invention also relates to a luminaire (130) comprising the frame (100).

19 Claims, 3 Drawing Sheets

(51) Int. Cl.
*F21V 19/00* (2006.01)
*F21V 15/01* (2006.01)
*F21V 23/00* (2015.01)
*F21V 29/15* (2015.01)
*F21Y 115/10* (2016.01)
*F21Y 103/10* (2016.01)
*F21Y 105/00* (2016.01)

(52) U.S. Cl.
CPC ............ *F21V 23/009* (2013.01); *F21V 29/15* (2015.01); *G02B 6/0091* (2013.01); *F21Y 2103/10* (2016.08); *F21Y 2105/00* (2013.01); *F21Y 2115/10* (2016.08); *G02B 6/0073* (2013.01)

(58) Field of Classification Search
CPC ...... F21V 15/01; F21V 19/005; F21V 23/009; H05K 1/0213; H05K 1/181; H05K 2201/10106; F21Y 2115/10; F21Y 2105/00; F21Y 2103/10
See application file for complete search history.

(56) References Cited

U.S. PATENT DOCUMENTS

| | | | |
|---|---|---|---|
| 2006/0083012 A1* | 4/2006 | Ter-Hovhannissian | ..................... B60Q 1/32 362/485 |
| 2007/0290965 A1* | 12/2007 | Shiraishi | ............ G02F 1/13452 345/87 |
| 2008/0030651 A1* | 2/2008 | Shibata | ................ G02B 6/0083 349/65 |
| 2009/0310339 A1* | 12/2009 | Jung | ................ G02F 1/133603 362/97.3 |
| 2011/0019126 A1 | 1/2011 | Choi et al. | |
| 2011/0170314 A1 | 7/2011 | Hsu et al. | |
| 2013/0094200 A1 | 4/2013 | Dellian et al. | |
| 2013/0322080 A1 | 12/2013 | Hsu et al. | |
| 2015/0008017 A1* | 1/2015 | Na | ........................ H05K 1/028 174/254 |
| 2015/0117025 A1 | 4/2015 | Adkins | |
| 2015/0117035 A1 | 4/2015 | Ahn et al. | |
| 2015/0177450 A1* | 6/2015 | Ahn | ..................... G02B 6/0088 362/606 |
| 2016/0306102 A1* | 10/2016 | Yoon | .................... G02B 6/0083 |
| 2017/0261803 A1* | 9/2017 | Teramoto | .......... G02F 1/133308 |
| 2018/0045880 A1* | 2/2018 | Boulanger | ............ F21V 21/088 |

FOREIGN PATENT DOCUMENTS

| | | |
|---|---|---|
| CN | 201576701 U | 9/2010 |
| CN | 202647322 U | 1/2013 |
| CN | 104409619 A | 3/2015 |
| CN | 104501048 A | 4/2015 |
| DE | 102013208221 A1 | 11/2014 |
| EP | 1799020 A1 | 6/2007 |
| KR | 1020130038062 A | 4/2013 |

* cited by examiner

FRAME FOR SUPPORTING A LIGHT GUIDE PANEL AND LUMINAIRE COMPRISING THE FRAME

FIELD OF THE INVENTION

The present invention generally relates to a frame for supporting a light guide panel. The invention also relates to a luminaire comprising the frame.

BACKGROUND OF THE INVENTION

A global need and desire for a reduced use of energy and in particular electricity has rapidly advanced the development of more energy efficient light sources. Lamps based on solid state light sources, so called solid state lighting lamps, SSL lamps, are constantly receiving more and more attention due to the low energy consumption compared to traditional incandescent light sources and fluorescent tubes. Typical examples of SSL lamps are light sources based on different types of light emitting diodes, LEDs. Such light sources are commonly referred to as LED lamps. LED lamps are becoming increasingly more energy efficient while the light flux from a typical LED lamp is increasing. Moreover, LED lamps have a long operational lifetime. As an example, LED lamps may last 100 000 hours which is up to 10 times the operational life of a fluorescent tube. The increased light flux and low energy consumption allows for that LED lamps are used for constantly growing number of applications.

For instance, in office spaces and residential spaces luminaries integrated into the ceiling are constantly receiving more and more attention due to their generally low energy consumption, high light flux and integration capabilities. So called light guide panels are commonly integrated into the ceiling, serving as ceiling panels while illuminating the space at the same time. A light guide panel is generally a plate or slab serving as light guide and typically being illuminated at its side, by a LED lamp thereby conducting or guiding light within the plate. The surface of the light guide panel or plate facing the space or room to be illuminated is typically employed with some form of structures or roughness to couple out light to illuminate the space or room in question. The plate or slab serving as light guide is typically supported by a frame commonly made of metal.

In luminaires using light guide panels, a driver is commonly employed to power the SSL light source used. The driver is sometimes integrated into the frame of the luminaire and thus supported by the frame. As the driver is commonly fed by the main voltage, certain safety regulations have to be fulfilled and adhered to. There are different approaches for fulfilling the relevant safety requirements. Such approaches are commonly associated with different undesired costs, which is why there is a desire to reduce production costs related to luminaries and frames using light guide panels.

SUMMARY OF THE INVENTION

According to a first aspect of the invention, the above is at least partly alleviated by a frame for supporting a light guide panel, the frame comprising: a solid state light source connected to and arranged on a circuit board, the circuit board comprising an electrically insulating outer perimeter portion; and an insulation layer being electrically insulating, the insulation layer having a surface area larger than a surface area of the circuit board; wherein the insulation layer is arranged on the frame; wherein the circuit board is arranged on the insulation layer such that an insulating outer perimeter portion of the insulation layer is formed outside of the circuit board; thereby providing a double insulation of the solid state light source in relation to the frame.

By means of the present disclosure, an improved frame for supporting a light guide panel is achieved. The frame according to the present disclosure provides a double insulation of the solid state light source, SSL light source, in relation to the frame itself. By providing a double insulation of the SSL light source in relation to the frame, a non-isolated driver may for instance be used while still fulfilling relevant safety requirements. Hence, the improved frame e.g. allows for use of a relatively speaking cheaper and smaller driver as compared to e.g. a SELV (Safety Extra Low Voltage) driver being double isolated and using a low output voltage.

The double insulation of the solid state light source in relation to the frame is achieved by the circuit board and the electrically insulating outer perimeter portion of the circuit board in combination with the insulation layer. The circuit board is arranged on the insulation layer such that an insulating outer perimeter portion of the insulation layer is formed outside of the circuit board. In other words, two insulating outer perimeter portions will separate the frame from the SSL light source, thereby providing double insulation. The insulation layer may be formed of a single unbroken layer or may be formed of a plurality of parts.

It should be noted that within the context of the application the term "insulating outer perimeter portion" may be any portion of any material providing electrical insulation to some extent. The insulating outer perimeter portion runs along the entire perimeter of the object being isolated. In case of a circuit board comprising an electrically insulating outer perimeter portion, the circuit board may typically comprise a portion with no components or leads along its entire perimeter. In other words, the electrically insulating outer perimeter portion of the circuit board will typically be devoid of anything that may conduct an electrical current. The insulating outer perimeter portion of the circuit board is thus typically formed by the non-conducting substrate of the circuit board. In case of an insulation layer, the insulation layer may typically extend outside of the object to be isolated, along the entire perimeter of the object to be isolated, so as to form an insulating outer perimeter portion. The insulating outer perimeter portion is thus typically devoid of any structures, objects or similar. A width of the insulating outer perimeter portion may vary along the perimeter.

The circuit board may comprise a material having a proof tracking index, PTI, greater than 600, wherein the electrically insulating outer perimeter portion of the circuit board may have a smallest width of 3.0 mm, preferably 1.5 mm. By this arrangement, an insulation qualifying as a basic insulation according to the standard IEC 60112 may be achieved for RMS working voltages not exceeding 500 volts by the circuit board. Having a smallest width of 1.5 mm an insulation qualifying as a basic insulation according to the standard IEC 60112 may be achieved for RMS working voltages not exceeding 250 volts. Relevant safety requirements may thus be fulfilled. It is to be noted that the circuit board may include other materials having other PTI:s. For instance, in case of a metal core printed circuit board, MCPCB, the circuit board will include metal, where the metal itself will be electrically conductive.

In order to qualify as a basic insulation according to the above standard, two criteria need to be fulfilled. The first criteria being that the material offers a sufficient electrical insulation. In case of a RMS working voltages not exceeding 500 volts a material having a proof tracking index, PTI, greater than 600 will suffice. The same is also true for a RMS working voltages not exceeding 250 volts. The second criteria being that a sufficient creepage distance is provided. In case of a RMS working voltages not exceeding 500 volts a creepage distance of 3.0 mm will suffice. In case of a RMS working voltages not exceeding 250 volts a creepage distance of 1.5 mm will suffice. For other voltages, other PTI:s and creepage distances are required, c.f. international standard IEC 60112.

The electrically insulating outer perimeter portion of the circuit board may consist of a material having a PTI greater than 600, which is advantageous in that a sufficient insulation may be provided by the outer perimeter portion. In other words, by having the insulating outer perimeter portion of the circuit board consisting of a material having a PTI greater than 600, the international standard IEC 60112 may be adhered to for RMS working voltages not exceeding 250 volts or 500 volts.

The insulation layer may consist of a material having a PTI greater than 600, wherein the insulating outer perimeter portion of the insulation layer may have a smallest width of 3.0 mm, preferably 1.5 mm. By this arrangement, an insulation qualifying as a basic insulation according to the standard IEC 60112 may be achieved for RMS working voltages not exceeding 500 volts by the insulation layer. Having a smallest width of 1.5 mm an insulation qualifying as a basic insulation according to the standard IEC 60112 may be achieved for RMS working voltages not exceeding 250 volts. Relevant safety requirements may thus be fulfilled.

The insulation layer may be planar, which is advantageous in that insulation layer may be arranged on a flat portion of the frame or circuit board.

The insulation layer may be bent, which is advantageous in that the insulation layer may be adapted to fit frames or circuit boards of various profiles and shapes. Moreover, the insulation layer may be bent so as to provide insulation on a plurality of surfaces of the frame or circuit board. The insulation layer may thus preferably be a flexible layer not losing its insulating properties although being bent. The insulation layer may be fabricated in a bent shape.

The insulation layer may be bent around at least one end portion of the circuit board, which is advantageous in that a double insulation of the solid state light source in relation to the frame may be achieved in an effective and secure manner.

The portion of the insulation layer bent around the at least one end portion of the circuit board may be fixed to the circuit board, which is advantageous in that an undesired misplacement or movement of the insulation layer may be counteracted.

The insulation layer may comprise a plurality of parts overlapping each other. By providing an insulation layer comprising a plurality of parts, the different parts of the insulation layer may be arranged on and fixed to different components or parts of e.g. a luminaire. The different parts of the insulation layer may thus be arranged so as to overlap when assembling the different components or parts of the exemplified luminaire. The overlap may thus be constituted such that the different parts of the insulation layer may act as a single insulation layer in terms of electrical insulation. Preferably, the overlap has a smallest overlap of 1.5 mm, more preferably 3.0 mm. By overlapping the different parts of the insulation layer by at least 1.5 mm a combined single insulation layer qualifying as a basic insulation according to the standard IEC 60112 may be achieved for RMS working voltages not exceeding 250 volts by the so combined insulation layer, i.e. the insulation layer comprising the different parts of the insulation layer. By overlapping the different parts of the insulation layer by at least 3.0 mm a combined single insulation layer qualifying as a basic insulation according to the standard IEC 60112 may be achieved for RMS working voltages not exceeding 500 volts by the so combined insulation layer, i.e. the insulation layer comprising the different parts of the insulation layer.

The insulation layer may comprise or be formed of a material chosen from the group consisting of PI film (such as Kapton) and fiberglass which is advantageous in that an efficient electrical insulation may be achieved by a relatively speaking thin layer.

The insulation layer may have a thickness within the range of 0.05 mm to 0.25 mm, which is advantageous in that a desired thermal conductivity may be achieved through the insulation layer.

The frame may further comprise a non-insulated driver for driving the solid state light source, which is advantageous in that a smaller and cheaper driver may be used while still fulfilling relevant safety requirements. By "non-isolated driver" is meant a driver not having a galvanic separation between an input side and an output side as is well known in the art.

The non-insulated driver may be configured to be powered by alternating voltage having a RMS working voltage below or equal to 500V, preferably 250V.

According to a second aspect of the invention, there is provided a luminaire comprising: a frame of the above described kind; and a light guide panel supported by the frame, wherein the solid state light source is configured to couple light into a side surface of the light guide panel. The frame being provided with the solid state light source as described above.

Features of this second aspect of the invention provide similar advantages as discussed above in relation to the first aspect of the invention.

It should be noted that within the context of the application the term "light guide panel" may be any panel, object, plate, slab or similar suitable for serving as light guide. In other words, any panel, object, plate, slab or similar suitable for conducting light may be used. The light guide panel may be made of a transparent, semitransparent or translucent material to give a few examples. Examples of suitable materials are glass, plastics and ceramics. The light guide panel may advantageously be provided with some form of structures, roughness or similar for coupling light out of the light guide panel as is known in the art. Further, the light guide panel may comprise additional layers e.g. for reducing glare. A backside of the light guide panel may be provided with a reflexive coating, such as a metal coating as is known in the art.

Typically, the solid state light source is configured to couple light into a side surface of the light guide panel. This may for instance be achieved by illuminating a side surface of the light guide panel by e.g. a SSL lamp, such as a LED. The light guide panel will thereby conduct or guide light within the panel.

The luminaire may further comprise a rim configured to fixate the light guide panel to the frame, which is advantageous in that the light guide panel may be firmly fixed to the frame.

The rim may be provided with an insulation layer being electrically insulating, the insulation layer of the rim and the insulation layer of the frame may be configured to overlap upon the rim is fixating the light guide panel to the frame. By this arrangement, the insulation layer of the rim and the insulation layer of the frame may be configured so as to overlap when assembling the frame and the rim. The overlap may thus be constituted such that the insulation layer of the rim and the insulation layer of the frame may act as a single insulation layer in terms of electrical insulation. Preferably, the overlap has a smallest overlap of 1.5 mm, more preferably 3. By overlapping the insulation layer of the rim and the insulation layer by at least 1.5 mm a combined single insulation layer qualifying as a basic insulation according to the standard IEC 60112 may be achieved for RMS working voltages not exceeding 250 volts by the so combined insulation layer, i.e. the insulation layer the insulation layer of the rim and the insulation layer. By overlapping the different parts of the insulation layer by at least 3.0 mm a combined single insulation layer qualifying as a basic insulation according to the standard IEC 60112 may be achieved for RMS working voltages not exceeding 500 volts by the so combined insulation layer, i.e. the insulation layer comprising the different parts of the insulation layer.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described as such device vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to the appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

Figure 1:
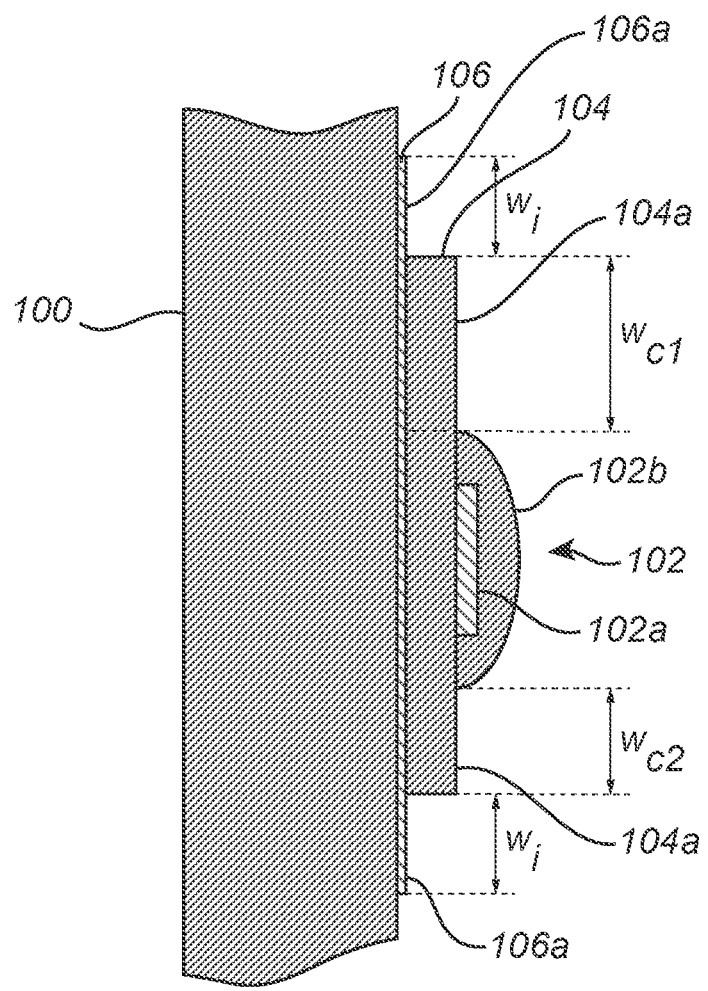
FIG. 1 conceptually illustrates a cross section of a double insulation of a solid state light source in relation to a frame.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Referring now to the drawings and to FIG. 1 in particular, here is conceptually, in a cross sectional view, depicted how a double insulation of a solid state light source 102 in relation to a frame 100 may be achieved. The frame 100 may be metal frame made of aluminum. Other metals may however be used for the frame 100. The frame 100 typically comprises four profiles joined together at their respective end portions for forming a square or rectangular frame. However, the frame 100 may comprise three profiles joined together at their respective end portions for forming a triangular frame. Further, the frame 100 may comprise a plurality of profiles joined together at their respective end portions for forming a polygonal frame.

The solid state light source 102, SSL 102, is in the depicted embodiment a LED light source 102, where light is emitted from a LED die 102a. The LED die 102a may optionally be covered by a lens 102b. Other types of solid state light sources 102 may be used to supplement the LED light source 102 or to complement the LED light source 102. The LED light source 102 is arranged on a circuit board 104. The LED light source 102 and the circuit board 104 typically forming a L2 package as in known in the art. The solid state light source 102 is thus connected to and arranged on a circuit board 104. The circuit board 104 comprising an electrically insulating outer perimeter portion 104a. The perimeter portion 104a runs along the entire perimeter of the circuit board 104. The insulating outer perimeter portion 104a being devoid of any components, leads or otherwise electrically conducting structures. Also the footprint area of the LED light 102 is excluded from the insulating outer perimeter portion 104a. The insulating outer perimeter portion 104a exhibits a width $w_{c1}$, $w_{c2}$. The width $w_{c1}$, $w_{c2}$ of the insulating outer perimeter portion 104a may vary along the perimeter of the circuit board 104. In the depicted embodiment of FIG. 1, the insulating outer perimeter portion 104a exhibits a greater width $w_{c1}$ at an upper portion as compared to a lower portion exhibiting a width $w_{c2}$.

An insulation layer 106 being electrically insulating is provided between the circuit board 104 and the frame 100. A surface area of the insulation layer 106 is larger than a surface area of the circuit board 104. The circuit board is arranged on the insulation layer 106 such that an insulating outer perimeter portion 106a of the insulation layer 106 is formed outside of the circuit board 104. The perimeter portion 106a runs along the entire perimeter of the insulation layer 106 and thus outside of the circuit board 104. The insulating outer perimeter portion 106a being devoid of any components, leads or otherwise electrically conducting structures. In other words, the footprint area of the circuit board 104 is excluded from the insulating outer perimeter portion 106a. The insulating outer perimeter portion 106a exhibits a width $w_i$. The width $w_i$, of the insulating outer perimeter portion 106a may vary along the perimeter of the insulation layer 106. In the depicted embodiment of FIG. 1, the insulating outer perimeter portion 106a exhibits a constant width $w_i$.

The above described arrangement of the circuit board 104 comprising the insulating outer perimeter portion 104a and the insulation layer 106 comprising the insulating outer perimeter portion 106a provides for a double insulation of the solid state light source 102 in relation to the frame 100.

In the depicted arrangement of FIG. 1, the circuit board 104 comprises a material having a proof tracking index, PTI, greater than 600, and the electrically insulating outer perimeter portion 104a of the circuit board 104 is having a smallest width $w_{c2}$ of 1.5 mm. The circuit board 104 may for example comprise MCPCB, CEM1 or CEM3 which all comprises suitable materials having a proof tracking index, PTI, greater than 600. A combination of said materials may also be used in the circuit board 104.

In the depicted embodiment of FIG. 1, the substrate or carrier of the circuit board 104 is a MCPCB. Further, the substrate or carrier of the circuit board 104 may alternatively be CEM1 or CEM3. Furthermore, the substrate or carrier of the circuit board 104 may be a mixture of two or more of MCPCB, CEM1 and CEM3.

Moreover, in the depicted embodiment of FIG. 1, the electrically insulating outer perimeter portion consists of a MCPCB. In other words, the outer perimeter portion of the circuit board consist of a material having a PTI greater than 600. Just like the substrate or carrier of the circuit board 104, the outer perimeter portion 104a may alternatively be CEM1 or CEM3. Furthermore, the outer perimeter portion 104a may be a mixture of two or more of MCPCB, CEM1 and CEM3.

In the depicted arrangement of FIG. 1, the insulation layer 106 consists of a material having a PTI greater than 600, and the insulating outer perimeter portion 106a of the insulation layer 106 is having a smallest width $w_i$ of 1.5 mm. In the depicted embodiment of FIG. 1, the insulation layer 106 is made of Kapton. Further, the insulation layer 106 may advantageously be made of PI film (such as Kapton) or fiberglass, or a combination thereof. Said materials are suitable materials having a proof tracking index, PTI, greater than 600.

As can be seen in FIG. 1, the insulation layer 106 of the depicted embodiment of FIG. 1 is a planar layer. The insulation layer 106 may however be bent for example so as to follow the shape of the frame 100 and/or the circuit board 104. The insulation layer 106 is advantageously arranged between the frame 100 and the circuit board 104, and follows the shape of the frame 100 and the circuit board 104. The insulation layer 106 may however be bent so as to exhibit other shapes suitable for the application in question. The insulation layer 106 may thus be flexible or pre-shaped in its intended shape, i.e. being pre-bent.

Figure 2A:
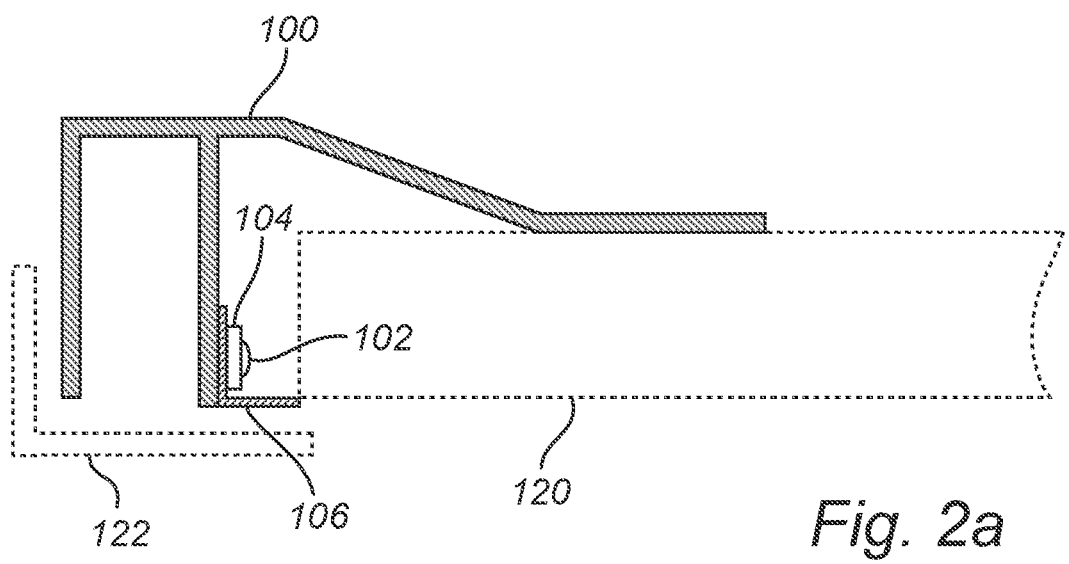
FIGS. 2a-2c conceptually illustrates cross sections of double insulation of a solid state light source in relation to a frame according to different embodiments.
Figure 2B:
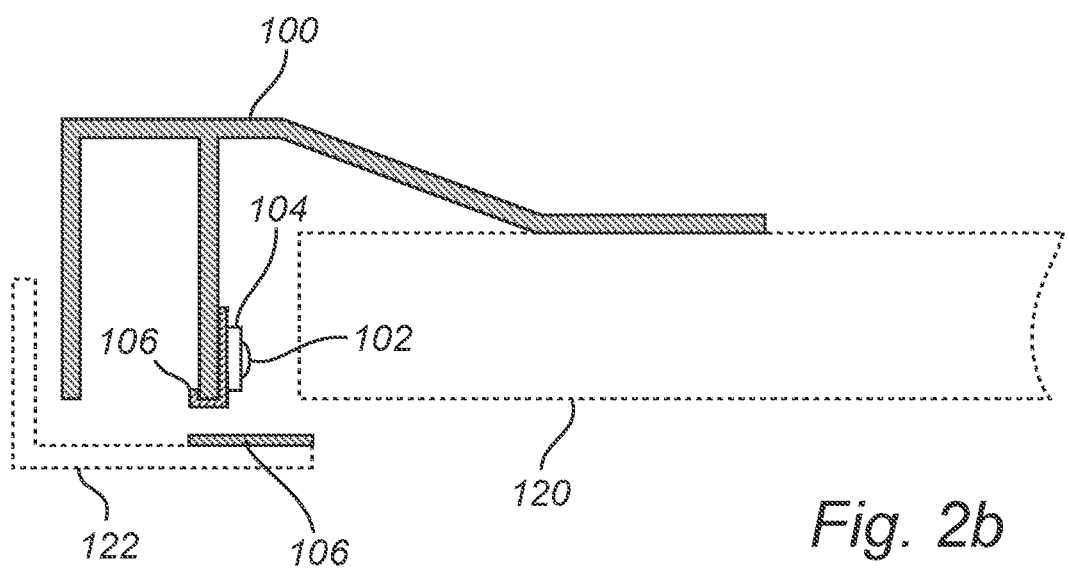
Figure 2C:
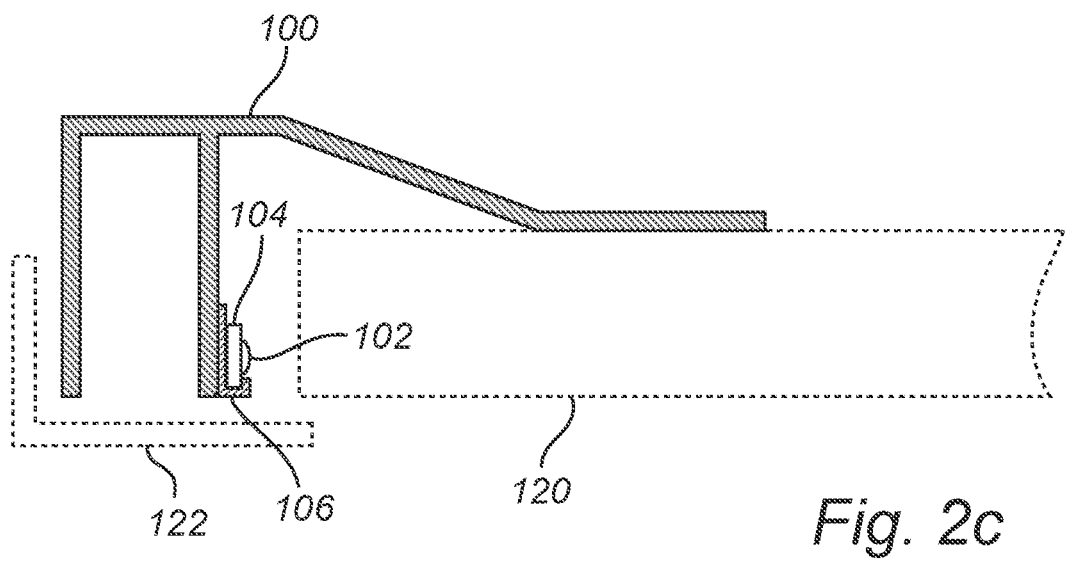

Exemplifying embodiments how a double insulation of a solid state light source 102 in relation to a frame 100 may be achieved will now be described in greater detail with reference to FIGS. 2a-2c. In particular FIGS. 2a-2c depicts, in a cross sectional view, different exemplifying ways of arranging the insulation layer 106 in relation to the circuit board 104 and the frame 100 of FIG. 1. In other words, FIGS. 2a-2c are like except for the arrangement of the insulation layer 106. As a matter of consequence, differences between FIGS. 2a-2c will be described. FIGS. 2a-2c, discloses a frame 100 for supporting a light guide panel 120. The light guide panel 120 is shown in phantom in its intended position, to not obscure arrangement of the insulation layer 106 in relation to the circuit board 104 and the frame 100. Further, FIGS. 2a-2c, discloses a rim 122 configured to fixate the light guide panel 120 to the frame 100. The rim 122 is shown in phantom in a position slightly removed from its intended position, i.e. the position where the rim 122 fixates the light guide panel 120, so as to not obscure the arrangement of the insulation layer 106 in relation to the circuit board 104 and the frame 100.

The frame 100, the solid state light source 102, the circuit board 104 and the insulation layer 106 are of the kind disclosed in relation to FIG. 1 above. Consequently, these elements will not be described again, to avoid undue repetition.

Now referring to FIG. 2a, here is conceptually depicted how the insulation layer 106 is bent in a L-shape, to fit the frame 100 and the rim 122. The insulation layer 106 may be pre-bent to exhibit the L-shape or may be a flexible layer which is bent by the rim 122, when the rim 122 is introduced into its intended position for fixating the light guide panel 120. In other words, the insulation layer 106 may be pre-bent or bent during assembly. By the L-shape arrangement of the insulation layer 106 in FIG. 2a, a double insulation of the solid state light source 102 in relation to the frame 100 may be achieved.

Now referring to FIG. 2b, here is conceptually depicted how the insulation layer 106 comprises a plurality of parts overlapping each other. In the depicted embodiment of FIG. 2b the insulation layer 106 comprises two parts. A first part of the insulation layer 106 is bent in a J-like shape around a portion of the frame 100, whereas a second part is attached to the rim 122. In the depicted embodiment of FIG. 2b, the first part of insulation layer 106 may be pre-bent to exhibit the J-like shape or may be a flexible layer which is bent in-situ so as to exhibit its final shape. Advantageously, the first part of the insulation layer 106 is fixed to the frame 100 so as to counteract that the insulation layer 106 ends up in an undesired position or is bent in an undesired manner. Advantageously, the second part of the insulation layer 106 is fixed to the rim 122. The second part of the insulation layer 106 is provided on the rim 122 such that the first part of the insulation layer 106 and the second part of the insulation layer 106 overlap upon the rim 122 is fixating the light guide panel 120 to the frame 100, i.e. when the rim 122 is fixed in its intended position.

By the J-like shape arrangement of the first part of the insulation layer 106 in combination with the second part of the insulation layer in FIG. 2b, a double insulation of the solid state light source 102 in relation to the frame 100 may be achieved. It is to be noted that any number of parts may form the insulation layer 106. For instance, three, five or ten parts may be used to give a few non-limiting examples.

Now referring to FIG. 2c, here is conceptually depicted how the insulation layer 106 is bent around an end portion of the circuit board 104. The portion of the insulation layer 106 being bent around the end portion of the circuit board 104 is fixed to the circuit board 104. By this arrangement, the mounting of the circuit board 104 with respect to the frame 100 may be facilitated. Moreover, the fixation of the insulation layer 106 may counteract that the insulation layer 106 ends up in an undesired position or is bent in an undesired manner. The bending of the insulation layer 106 around the end portion of the circuit board, results in that at least a portion of side surface of the circuit board 104 and at least a portion of a front surface of the circuit board 104 being covered by the insulation layer 106. By the bending of the insulation layer 106 in FIG. 2c around at least one end portion of the circuit board 104, a double insulation of the solid state light source 102 in relation to the frame 100 may be achieved.

Figure 3:
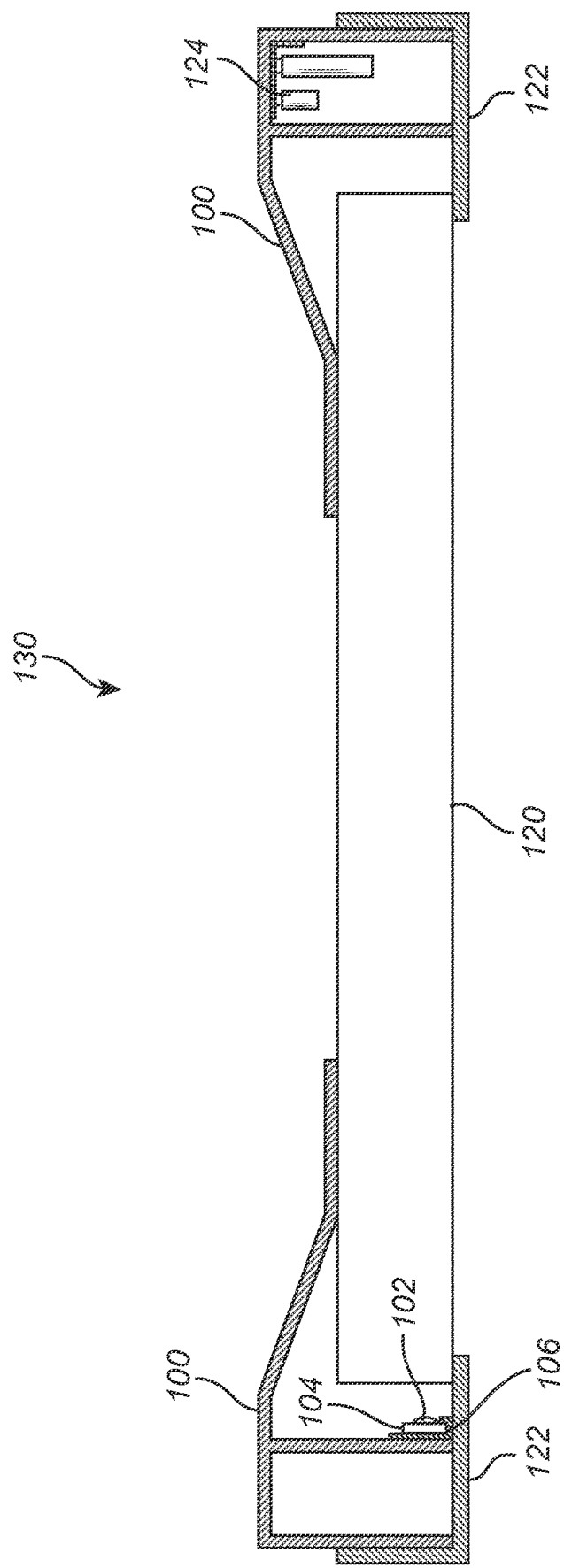
FIG. 3 conceptually illustrates a cross section of a luminaire comprising a frame and a light guide panel supported by the frame.

Now referring to FIG. 3, here is conceptually, in a cross sectional view, depicted a luminaire 130. The luminaire 130 comprises a frame 100 of the above described kind and a light guide panel 120 supported by the frame 100. The luminaire further comprises a rim 122 fixating the light guide panel 120 to the frame 100.

In the left depicted part of the frame 100 in FIG. 3, the insulation layer 106 is configured as in FIG. 2c, i.e. where the insulation layer 106 is bent around an end portion of the circuit board 104. Further, the depicted left part of the frame 100 is employed with a solid state light source 102 and a circuit board 104 as described above in conjunction with FIGS. 1 and 2c. The solid state light source 102 is configured to couple light into a side surface of the light guide panel 120. For this reason, the solid state light source 102 is directed towards the side surface of the light guide panel 120 as depicted in FIG. 3.

The frame 100 of the luminaire 130, further comprising a non-insulated driver 124 for driving the solid state light source 102. In the depicted luminaire 130 of FIG. 3, the driver 124 is provided at the right depicted part of the frame 100. The driver 124 is provided in a space formed by the frame 100, such that the addition of the driver 124 does not influence the physical dimensions of the luminaire 130. In the depicted embodiment of FIG. 3, the driver 124 is configured to be powered by alternating voltage having a RMS working voltage below or equal to 250V. Typically, the driver 124 is powered by the mains having a RMS working voltage of 230 V or 110 V depending on jurisdiction. By keeping the RMS working voltage below or equal to 250V, a double insulation fulfilling international standard IEC 60112 of the solid state light source 102 in relation to the frame 100 is achieved by the circuit board 104 having an electrically insulating outer perimeter portion 104a and the insulation layer 106, although a non-isolated driver 124 is used. An isolated driver may be used as an alternative.

Furthermore, it is to be understood that the circuit board 104 with the insulating outer perimeter portion 104a and the insulation layer 106 may provide a higher insulation level than the above exemplified basic insulation level. In that case a higher RMS working voltage may be used while still fulfilling relevant safety requirements.

Even though the invention has been described with reference to specific embodiments thereof, many different alterations, modifications and the like will become apparent for those skilled in the art. For example, it is to be understood that a plurality of solid state light sources 102 may be used to illuminate different side surfaces of the light guide panel 120. The number solid state light sources may be greatly varied irrespective of the general design of the luminaire 130.

Moreover, the material, thickness, thermal conductivity, structure etc. of the insulation layer 106 may be greatly varied. For instance, the thermal management of the solid state light source 102 may be tuned by the selection of the insulation layer 106. Further, additional layers may be used to provide or enhance desired insulation properties.

Also, the driver 124 may be varied. The driver 124 may be located outside of the luminaire 130 and connected to the luminaire 130 by means of electrical cables. Further, a single driver 124 may be used to power a plurality of luminaires 130. In case of a plurality of solid state light sources 102 in the same luminaire 130, some solid state light sources 102 may be powered by a driver 124, while other solid state light sources 102 may be powered by another driver 124 or a plurality or other drivers 124.

Hence, although the invention has been described with reference to specific exemplifying embodiments thereof, many different alterations, modifications and the like will become apparent for those skilled in the art. Variations to the disclosed embodiments may be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A frame for supporting a light guide panel, the frame comprising:
   a solid state light source connected to and arranged on a circuit board, the circuit board comprising an electrically insulating outer perimeter portion; and
   an insulation layer being electrically insulating, the insulation layer having a surface area larger than a surface area of the circuit board;
   wherein the insulation layer is arranged on the frame;
   wherein the circuit board is arranged on the insulation layer such that an insulating outer perimeter portion of the insulation layer is formed outside of the circuit board, thereby providing a double insulation of the solid state light source in relation to the frame;
   wherein the insulation layer wraps around the circuit board or the frame.

2. The frame according to claim 1, wherein the circuit board comprises a material having a proof tracking index, PTI, greater than 600, and wherein the electrically insulating outer perimeter portion of the circuit board has a width of about 1.5 mm to 3.0 mm.

3. The frame according to claim 2, wherein the electrically insulating outer perimeter portion of the circuit board consist of a material having a PTI greater than 600.

4. The frame according to claim 1, wherein the insulation layer consists of a material having a PTI greater than 600, wherein the insulating outer perimeter portion of the insulation layer has a width of about 1.5 mm to 3.0 mm.

5. The frame according to claim 1, wherein the insulation layer is bent to follow the shape of the frame.

6. The frame according to claim 5, wherein the insulation layer is bent around at least one end portion of the circuit board.

7. The frame according to claim 6, wherein the portion of the insulation layer bent around the at least one end portion of the circuit board is fixed to the circuit board.

8. The frame according to claim 1, wherein the insulation layer comprises a plurality of parts overlapping each other.

9. The frame according to claim 1, further comprising a non-insulated driver for driving the solid state light source.

10. The frame according to claim 9, wherein the non-insulated driver is configured to be powered by alternating voltage having a RMS working voltage below or equal to 500V.

11. The frame according to claim 9, wherein the non-insulated driver is configured to be powered by alternating voltage having a RMS working voltage of approximately 250V.

12. A luminaire comprising:
    the frame according to claim 1; and
    a light guide panel supported by the frame,
    wherein the solid state light source is configured to couple light into a side surface of the light guide panel.

13. The luminaire according to claim 12, further comprising a rim configured to fixate the light guide panel to the frame.

14. The luminaire according to claim 13, wherein the rim is provided with an insulation layer being electrically insulating, the insulation layer of the rim and the insulation layer is configured to overlap upon the rim is fixating the light guide panel to the frame.

15. The frame according to claim 1, wherein the electrically insulating outer perimeter portion of the circuit board comprises no components or leads that conduct electrical current.

16. The frame according to claim 1, wherein insulating outer perimeter portion of the insulation layer is formed outside of the entire perimeter of the circuit board.

17. The system according to claim 1, further comprising a non-insulated driver for driving the solid state light source, the driver being supported by the frame.

18. The system according to claim 17, wherein the non-insulated driver is configured to be powered by alternating voltage having a RMS working voltage below or equal to 500V.

19. A system comprising:
   a frame;
   a light guide panel supported by the frame;
   an insulation layer arranged on the frame, wherein the insulation layer is electrically insulating; and
   a circuit board comprising a solid state light source, the circuit board further comprising an electrically insulating outer perimeter portion of the circuit board that surrounds the entire perimeter of the circuit board;
   wherein the circuit board is arranged on the insulation layer such that an insulating outer perimeter portion of the insulation layer is formed around the entire perimeter of the circuit board, thereby providing insulation of the solid state light source in relation to the frame,
   wherein the insulation layer has a surface area larger than a surface area of the circuit board, and
   wherein the insulation layer wraps around the circuit board or the frame.

* * * * *